April 14, 1931.  C. W. BURROWS ET AL  1,800,676
APPARATUS FOR TESTING MAGNETIZABLE OBJECTS
Filed Oct. 20, 1923  2 Sheets-Sheet 2
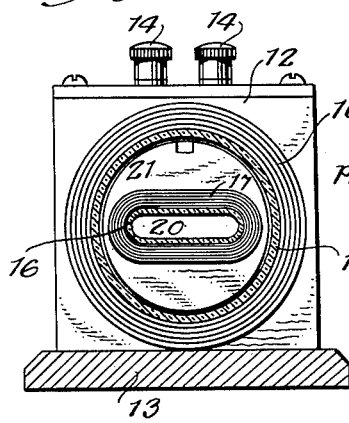
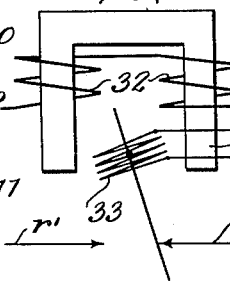
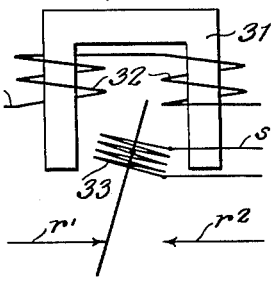
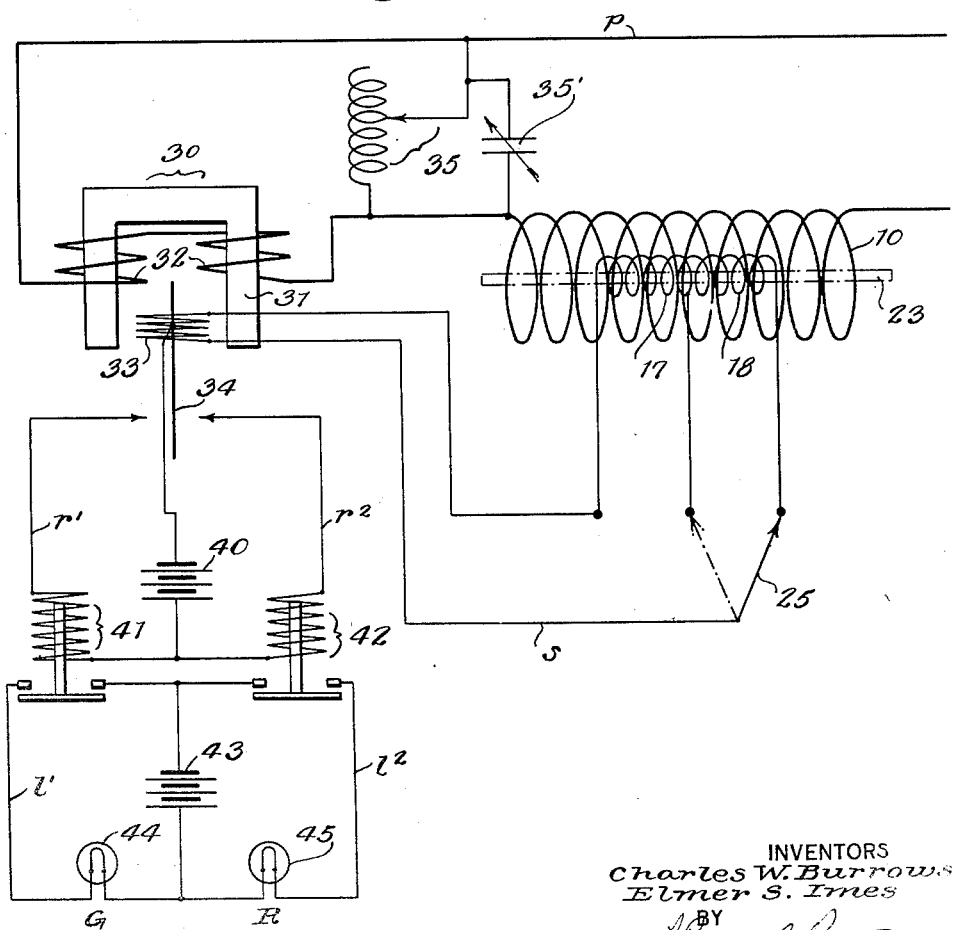
INVENTORS
Charles W. Burrows
Elmer S. Imes
BY
ATTORNEY Patented Apr. 14, 1931

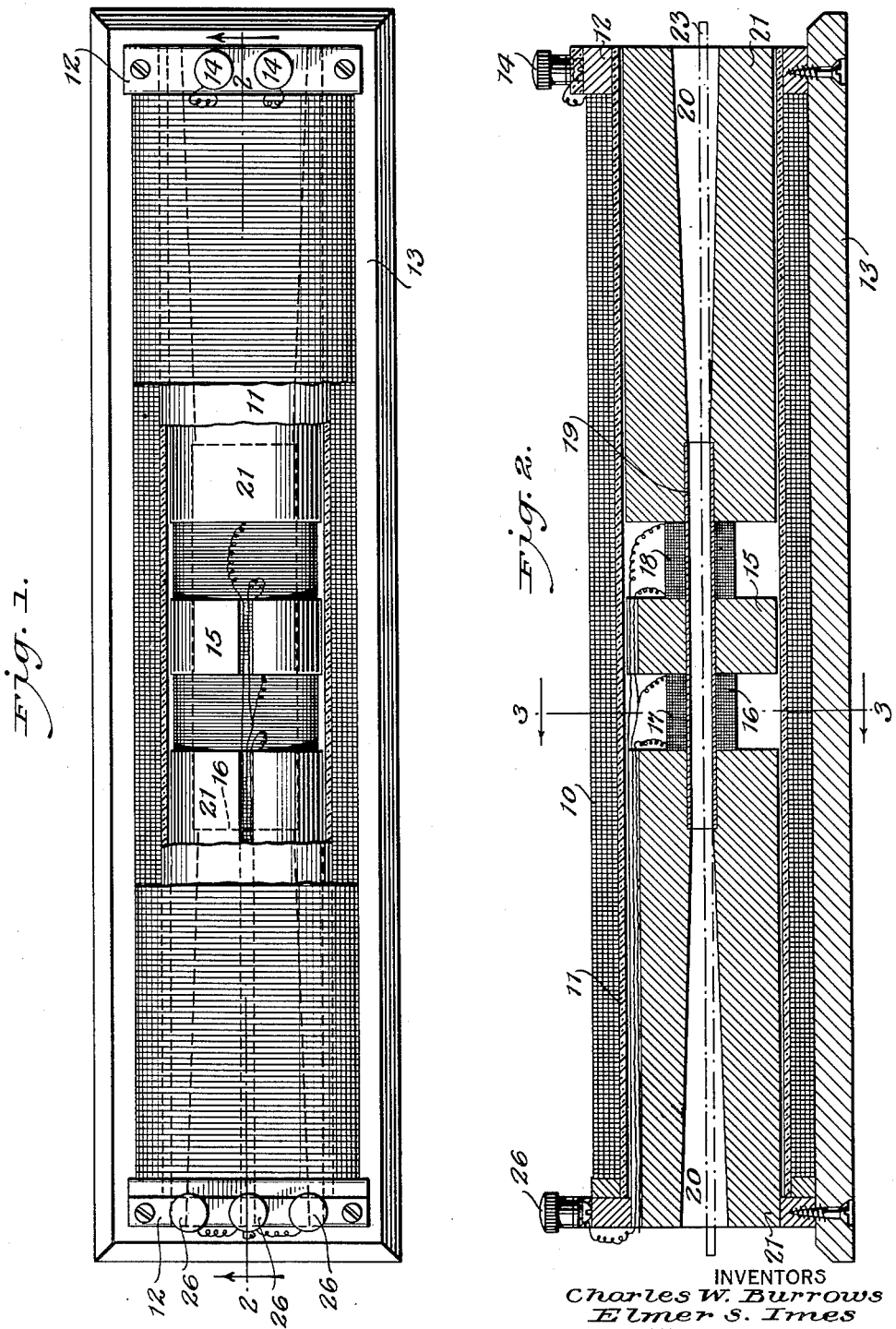

1,800,676

UNITED STATES PATENT OFFICE

CHARLES W. BURROWS, OF NEW YORK, N. Y., AND ELMER S. IMES, OF JERSEY CITY, NEW JERSEY, ASSIGNORS, BY MESNE ASSIGNMENTS, TO MAGNETIC ANALYSIS CORPORATION, OF LONG ISLAND CITY, NEW YORK, A CORPORATION OF NEW YORK

APPARATUS FOR TESTING MAGNETIZABLE OBJECTS

Application filed October 20, 1923. Serial No. 669,726.

This invention relates to improvements in methods of testing magnetizable objects and to novel apparatus for efficiently carrying out the method. Patent No. 1,322,405 issued on the eighteenth day of November, 1919, reissued June 17, 1924, Re. #15,859, disclosed a method of testing magnetizable objects which was dependent for its successful operation upon relative movement between the specimen to be tested and a magnetic field. No test could be made without such relative movement. It is an object of the present invention to eliminate the necessity for such relative movement and test while both specimen and field are fixed.

We contemplate, however, an apparatus wherein relative movement between the field and specimen will indicate any variations of quality in different parts of the same specimen. It will be apparent that an apparatus of this character may be used for testing comparatively short objects, such as taps, drills, etc. by merely inserting them in the machine and throwing on the testing current. Longer objects, such as rails, cables, etc. may be passed through the machine to indicate variations from standard or any flaws in their structure.

Our invention has for one of its main objects, the provision of means for expediting the testing operation and permitting unskilled operators to perform the testing. Further objects are the simplification of the construction of the apparatus, the provision of an apparatus which will be durable and efficient in use and which may be manufactured with comparative economy.

With these and other objects in view, the invention consists in certain novel features of construction and combinations and arrangements of parts as will be more fully hereinafter described and pointed out in the claims.

In the accompanying drawings,

Figure 1 is a view in side elevation with parts broken away for clearness of the specimen receiving coils of our improved apparatus, Fig. 2 is a view in longitudinal section on the line 2—2 of Fig. 1, Fig. 3 is a transverse sectional view on the line 3—3 of Fig. 2, Fig. 4 is a wiring diagram, and Figs. 5 and 6 are diagrammatic views showing the operation of our signalling dynamometer.

Referring with particularity to the drawings, reference character 10 designates the primary or inducing coil of the apparatus. This coil forms part of the primary circuit $p$ (see wiring diagram) and is wound upon a hollow core 11 of insulating material. The coil 10 is supported between plates or standards 12 rising from the ends of a supporting base plate 13. Terminals for the coil in the form of conventional binding posts 14, 14 are mounted on one of the plates.

A block 15 centrally disposed in the hollow core 11 is bored to receive the intermediate portion of a hollow core 16 upon the ends of which testing coils 17, 17 are wound. The ends of the core 16 are received in the enlarged ends 19 of passageways 20 extending through specimen receiving sleeves 21 arranged in the ends of the hollow core 11. The sleeves 21 and core 11 thus co-operate to provide a narrow flat passageway within the testing coils for the reception of a specimen indicated in dotted lines at 23 in Figs. 2 and 4.

The switch 25 indicated diagrammatically in Fig. 4 permits a single testing coil or both coils to be optionally used. The coils 17, 18 form part of the secondary or induced circuit $s$. The ends of coils 17, 18 are connected to suitable terminals 26, 26 on one of the plates 12.

Alternating or other reversing current is preferably used in the primary or inducing circuit $p$ and is supplied from any suitable source (not shown). When the specimen is inserted within the core 16, it will co-operate with the coils 17, 18 and the coil 10 to form in effect a transformer and the characteristics of the current induced in the coils 17, 18 will be determined by the magnetic properties of the specimen. It is generally recognized that the magnetic characteristics of a magnetizable object correspond to its mechanical characteristics and vice versa.

We are able by measuring variations in the induced current to determine the relative physical properties of different specimens or of different parts of the same specimen. By selecting a specimen as standard and noting the characteristics of the current induced in the coils 17, 18 and their circuit s, it is comparatively simple to detect variations from standard when testing other specimens.

While the principle of the transformer has been used previously in detecting the magnetic characteristics of specimens, in all prior apparatus and methods the indicating instrument indicated merely the variations in the secondary circuit, giving a measure of potential or amperage of the induced current, without taking into account the effect reflected in the primary circuit. In our apparatus and method we obtain an energy indication rather than an indication of potential or current. In other words, our instrument is sensitive to the hysteresis energy of the specimen under test and hence determines characteristics which are indeterminable by other apparatus or methods referred to above.

The apparatus for carrying out our improved method of testing is best shown in the wiring diagram of Figure 4. In this figure, there is indicated generally at 30 a dynamometer. The showing of the dynamometer has been made diagrammatical, 31 representing the core around which the stationary coils 32 are wound, these coils forming part of the primary or inducing circuit p. Disposed normally parallel with the path of magnetic flux, between the poles of the core, is the movable coil 33 forming a part of the closed secondary or induced circuit s. The customary needle or pointer 34 is carried by the moving coil of the instrument. The manner in which the dynamometer operates will of course be readily understood.

An adjustable inductive resistance indicated at 35 is shunted across the primary circuit p to regulate the circuit passing through the stationary coils of the dynamometer. It is frequently desirable to use more current in the primary circuit than can be safely used in the instrument, and for this reason, we have provided the inductive resistance shunt. A capacity such as the condenser 35' is also shunted across the primary circuit, so that the phase as well as the strength of the current in the stationary coils may be varied.

In order that the invention be clearly understood, it may be advisable to discuss generally the manner in which the apparatus functions before proceeding with a description of the relay and signal circuits controlled by the dynamometer. Our apparatus permits any specimen to be selected as a standard. The specimen selected is inserted within the coils 17, 18. As before stated, the physical characteristics of this standard specimen will determine its magnetic characteristics, and consequently will determine the characteristics of the current induced in the coils 17, 18 by the coil 10. It is desirable that the dynamometer read at zero for a standard specimen so that deflections caused by relatively harder or softer specimens may be more readily detected. While the standard specimen is in operative position, therefore, the condenser is adjusted to shift the phase of the current in the stationary coils of the instrument until the phase of such current is at a 90 degree variance to the phase of the current in the moving coil. By this operation, the needle or pointer is caused to register at zero assuming the neutral position of Figure 4.

Assuming that a softer specimen is substituted for the standard specimen, the resulting change in the phase characteristics of the induced current will tend to swing the pointer 34 toward the position of Figure 5. If a specimen harder than the predetermined standard be substituted, its increased resistance will tend to oppositely vary the phase characteristics of the induced current and the pointer will now swing in the opposite direction, as shown in Figure 6. If a relatively long specimen such, for instance, as a cable is passed through the passageways 20, variations in structure or flux can be easily detected by the action of the pointer, as will be readily understood.

For laboratory work, it is advisable to use a finely graduated scale or dial with the pointer 34 so that variations from standard may be accurately measured. When our apparatus is used commercially, however, slight variations from standard are not important and it is not essential that the particular degree of variation be known. It is sufficient to detect and discard only such specimens as vary from standard to a predetermined and relatively great extent. We find it of great commercial importance, therefore, to utilize a system of unmistakable visible or audible signals to advise an operator of what may be termed for convenience unpermissible or fatal variations from standard in the specimen subjected to testing.

This system of signal control is adapted for use regardless of the amount of deviation from standard which may be permitted since the mechanism might be adjusted to become operative upon any predetermined deviation. Obviously, the signaling system might be used with voltmeters, ammeters, wattmeters, galvanometers and a great variety of other measuring instruments equally as well as with a dynamometer.

The wiring diagram of Fig. 4 clearly shows how this part of our invention is carried out. A source of electric energy such as the battery 40 is adapted to supply current to either of a pair of normally open relay circuits $r^1$, $r^2$, which respectively control relays 41, 42. The relays are adapted to close the lamp circuits $1^1$ and $1^2$ respectively. The lamp circuits are supplied with current from a convenient source such as the battery 43. A green lamp 44 forms part of the circuit $1^1$ and a red lamp 45 forms part of the circuit of $1^2$.

The pointer 34 acts as a switch or contact maker to close the circuit $r^2$ when moved to the position illustrated in Fig. 5 or to close the circuit $r^1$ when deflected to the extent shown in Fig. 6, said circuit closing operating through the intermediacy of the relays to light either the red or green lamp as the case may be. Any suitable visible or audible signal or other indicating means might be utilized in place of the lamps.

The operating of the signals greatly expedites the testing operation obviating the necessity for carefully reading the dynamometer and permitting the use of unskilled operatives in testing stock.

Numerous departures from the construction of the apparatus herein shown might be resorted to without departing from our invention and we shall consider ourselves at liberty to make such changes and alterations both in the method of testing and the apparatus for carrying it out as fairly fall within the spirit and scope of the appended claims.

We claim:

1. An apparatus for testing a magnetizable object which comprises a transformer in which the object is adapted to be placed, a dynamometer having a field coil in series with the primary coil of the transformer and a potential coil in series with the secondary coil of the transformer, and means for shifting the phase of current passing through said field coil.

2. An apparatus for testing a magnetizable object which comprises a transformer in which the object is adapted to be placed, a dynamometer having a field coil in series with the primary coil of the transformer and a potential coil in series with the secondary coil of the transformer, and means for shifting the relative phase of currents passing through the field coil and the potential coil respectively.

3. An apparatus for testing a magnetizable object comprising a primary circuit, a primary coil in said circuits, a secondary coil within the primary coil and adapted to receive the object to be tested, a dynamometer having a field coil in series with said primary circuit and a potential coil in series with said secondary coil, and means for varying the relative phase relation of said field coil to said potential coil.

4. Testing apparatus comprising a primary coil, means for energizing said coil, a secondary coil in the field produced when said primary is energized, an indicator, indicator actuating means including a field coil in series with said primary coils and a potential coil in series with said secondary coil, and means for shifting the phase of current in said field coil.

5. Testing apparatus comprising a primary coil, means for energizing said coil, a secondary coil in the field produced when said primary is energized, an indicator, indicator actuating means including a stationary coil in circuit with said primary coil and a potential coil in circuit with said secondary coil, and means for shifting the phase of current in said primary coil.

6. Testing apparatus comprising a primary circuit, a primary coil therein, a secondary coil within the primary coil and adapted to receive an object to be tested, an indicator, indicator actuating means including a field coil in series with said primary circuit and a potential coil in series with said secondary coil, and means for varying the relative phase relation of current in said field coil to current in said potential coil.

CHARLES W. BURROWS.
ELMER S. IMES.